June 17, 1958
L. P. DOSMANN
2,838,854
COMPOSITION AND ARTICLE
Filed Sept. 14, 1954
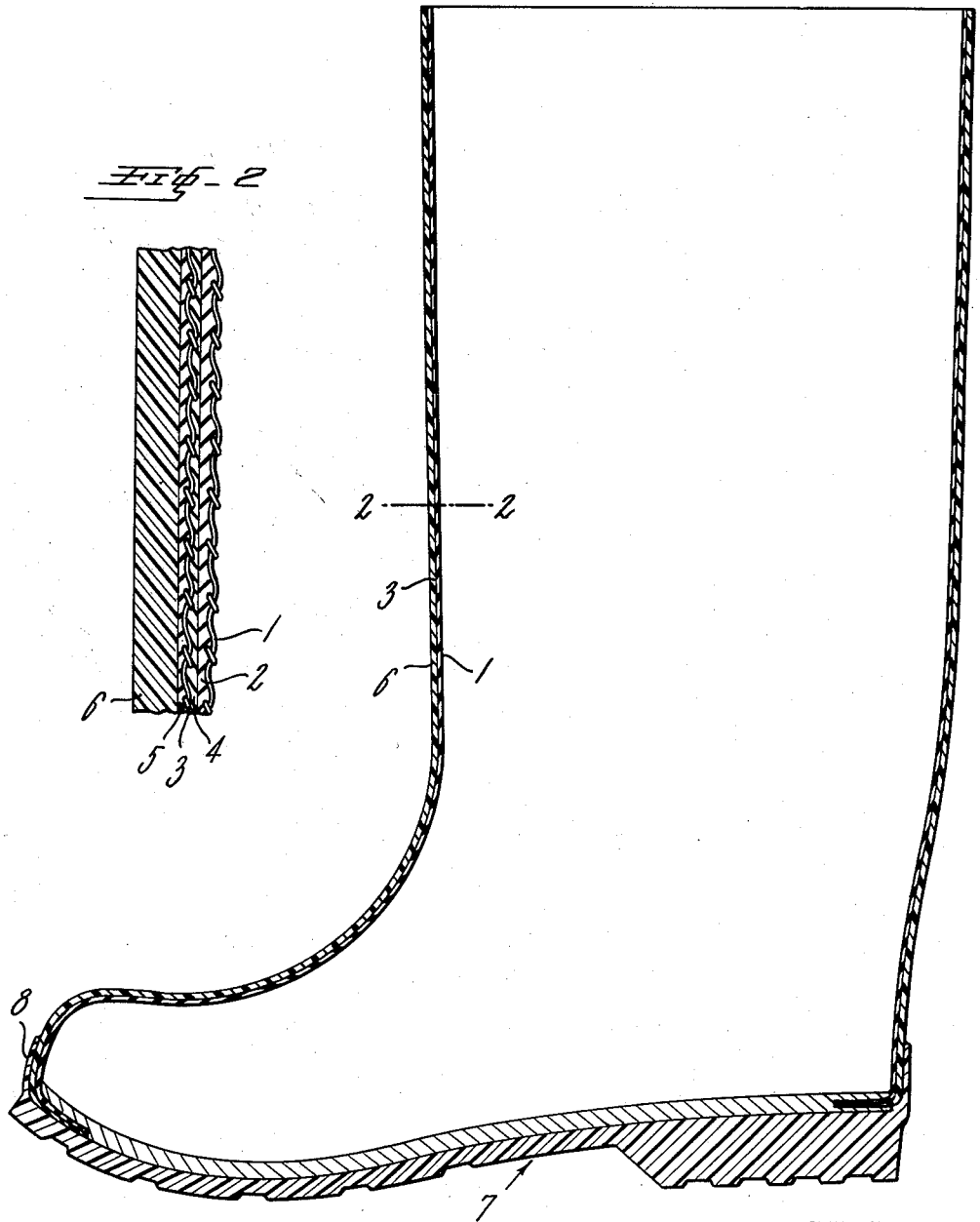
INVENTOR.
LUCIAN P. DOSMANN
BY
Robert J. Patterson
ATTORNEY

United States Patent Office 2,838,854
Patented June 17, 1958

2,838,854

COMPOSITION AND ARTICLE

Lucian P. Dosmann, South Bend, Ind., assignor to United States Rubber Company, New York, N. Y., a corporation of New Jersey Application September 14, 1954, Serial No. 455,896

5 Claims. (Cl. 36—4)

This invention relates to a composition of matter, a fabric coated therewith, and an acid-resisting boot embodying the said composition. More particularly, it relates to a composition of matter and articles of manufacture embodying the same, which composition and articles have unusual resistance to highly corrosive chemicals, especially fuming nitric acid. The composition and articles of my invention display remarkable resistance to liquid fuming nitric acid and to the diffusion of the vapors thereof. My invention is particularly adapted to the manufacture of a boot adapted to be worn by workers handling fuming nitric acid. Alternatively, the principles of my invention can be used in making coated fabrics suitable for the manufacture of acid-resisting clothing, such as aprons, jackets, trousers, etc.

The principal object of the present invention is to provide a new composition of matter which makes readily possible the commercial manufacture of articles, such as boots and items of acid-resisting clothing, which are eminently adapted to protect workers against corrosive chemicals, particularly fuming nitric acid whether in liquid or in vapor form. Another object is to make available a composition which can be easily processed with conventional rubber equipment, which has good fabrication properties permitting seaming and similar operations during manufacture, and which is readily curable by conventional vulcanizing procedures to give a product having low permeability to the vapors of fuming nitric acid and excellent resistance to liquid fuming nitric acid. Another object is to provide a composition of the foregoing type having good rubber-like properties, such as flexibility and resistance to flex cracking, good ozone resistance, good resistance to ultra-violet light, and low permanent set. Another object is to provide a boot exhibiting remarkable resistance to liquid fuming nitric acid and to the vapors thereof and having in combination the desirable characteristics required in a boot and adapted to be readily made by ordinary rubber workers without a high degree of skill. Numerous other objects of my invention will more fully hereinafter appear.

In the accompanying drawings:

Fig. 1 is a vertical section through an acid-resisting boot made in accordance with my invention;

Fig. 2 is an enlarged section of the wall of the boot on the line 2—2 of Fig. 1; and Fig. 3 is a section through acid-resisting coated fabric made according to my invention.

My invention is based upon the discovery that a composition of matter combining the properties of high resistance to liquid and vaporous fuming nitric acid, good processibility, good flexibility, good resistance to flex cracking, good ozone-resistance, and good ultra-violet light resistance, and adapted to be easily fabricated into acid-resisting fabrics and acid-resisting boots, can be made from a curable mixture of 100 parts by weight of "Butyl rubber" (which, as is well known, is a sulfur-vulcanizable rubbery copolymer of a major proportion, i. e. 90–99.5%, of isobutylene and a minor proportion, 10–0.5%, of a conjugated diolefin hydrocarbon containing from 4 to 6 carbon atoms per molecule and typified by butadiene and isoprene), from 10 to 40 parts of polyethylene, from 15 to 70 parts of polyisobutylene having a molecular weight of at least 150,000, and from 50 to 70 parts of carbon black having a surface area of not over 8 acres per pound. By formulating a mixture of the foregoing ingredients in the proportions given, together with curatives of known type, almost invariably including sulfur, in amount sufficient to cure the Butyl rubber, there is obtained a mixture which can be readily calendered onto fabric and used in the fabrication of acid-resisting boots and other articles of clothing.

In practicing my invention, I can simply commingle the foregoing ingredients to form an intimate homogeneous mixture, as by mastication on an ordinary open rubber mill or in a Banbury mixer, and vulcanize the resulting mixture, usually after application to fabric by calendering or after molding into any desired shape, for example, into the form of a boot sole.

However, I find that much better results are achieved by masticating a mixture of 100 parts by weight of Butyl rubber, from 50 to 70 parts of the aforementioned carbon black, and from 0.025 to 0.1 part of para-dinitrosobenzene (which is available commercially as "Polyac" which is a mixture of 25% para-dinitrosobenzene and 75% of inert carrier) at a temperature of at least 300° F., ranging upwardly therefrom to a point just short of that at which the mixture would be injured by thermal decomposition, on an open rubber mill or in a Banbury mixer until the curing action of the para-dinitrosobenzene on the Butyl rubber is substantially completely exhausted, whereupon the resulting mixture is cooled down to a relatively low temperature, typically below 200° F., after which there are intimately incorporated therewith, by conventional milling or mastication, the polyethylene, the polyisobutylene, and the vulcanizing ingredients (the vulcanizing agent usually being sufur in conjunction with known accelerators of vulcanization), the latter being used in amount sufficient to complete the cure of the Butyl rubber, after which the mixture is shaped in any suitable way as by molding or calendering, and vulcanized in the conventional way.

When proceeding in the manner just described, I prefer to have from 1.5 to 3.5 parts of zinc oxide present during the high temperature mastication of the Butyl rubber-carbon black-para-dinitirosobenzene mixture. The presence of zinc oxide during this step is desirable because it activates the pre-curing or partial curing of the Butyl rubber with the para-dinitrosobenzene curative and is available later for performing its normal role in vulcanization. Where such pre-curing is not practical, zinc oxide in simiular amount is incorporated with the mixture prior to vulcanization.

The acid-resistance of the cured material of my invention is enhanced by the preliminary partial curing of the Butyl rubber-carbon black mixture in the manner described above. Such pre-curing appears to "fix" the carbon black and the Butyl rubber in such a way as to impart greater acid-resistance.

The carbon black is a very important component of my mixture. It functions as a processing aid, enabling the mixture to be readily calendered and it contributes important properties to the cured product. The type of carbon black is very important and it is essential that it have a surface area of not over 8 acres per pound to obtain satisfactory resistance to diffusion of fuming nitric acid. Typical examples of suitable carbon black are:

| | Surface area—acres/pound |
|---|---|
| Fine furnace (FF), "Statex B" | 7 |
| East extruding furnace (FEF), "Statex M" | 5 |
| High modulus furnace (HMF), "Statex 93" | 5 |
| Semi-reinforcing furnace (SRF), "Furnex" | 3.5 |

A tabulation of surface areas of a number of blacks will be found at the bottom of page 56 of an article by Sweitzer in Rubber Age, 72, 55–63 (October 1952). See also the paper by Braendle in "Colloidal Chemistry" (J. Alexander, Editor), vol. 6, pp. 408 et seq. (Reinhold Pub. Corp., New York, 1946).

I prefer to employ polyethylene having a molecular weight of from 8,000 to 12,000. An example of such a polyethylene is that sold as "Alathon 8" by the Du Pont Company. Polyethylenes having a molecular weight much in excess of 12,000 usually have an undesirably high yield point which requires elevated mixing and processing temperatures. Such higher molecular weight polyethylenes require processing temperatures so high as to injure the stocks and give products having poor resistance to diffusion by fuming nitric acid. Polyethylenes of molecular weight much below 8,000 are undesirable because of poor resistance to fuming nitric acid vapor diffusion.

The use of high molecular weight (150,000 or more) polyisobutylene is an important feature of my invention. I obtain best results using the form of polyisobutylene available commercially as "Oppanol B-200" which has a molecular weight of 200,000. Nearly as good results are obtained with the polyisobutylene available commercially under the trade-name "Vistanex B-200" which has a somewhat lower molecular weight. "Vistanex B-100," which has a molecular weight considerably below 150,000, is unsatisfactory because it gives surfaces that are inherently tacky after exposure.

In general, as the proportion of polyethylene used in my composition is increased within the above range, the proportion of polyisobutylene is similarly increased within the range given above in order to offset certain undesirable tendencies which might otherwise be imparted by the use of the higher proportions of polyethylene. Thus, the use of increasing relative proportions of polyisobutylene offsets the tendency of an increasing relative proportion of polyethylene to give higher permanent set, poorer resistance to fuming nitric acid vapor diffusion, lower softening temperature, poorer flex-cracking resistance, and poorer resistance to ozone and ultra-violet light.

If the polyisobutylene were omitted, the resulting product would have very poor flex resistance, very poor resistance to ozone and ultra-violet light, and impaired resistance to acid, both with respect to attack by liquid fuming nitric acid and with respect to diffusion of the vapor thereof.

The uncured mixture of my invention, whether it was made with the above-described preliminary partial curing of the Butyl rubber-carbon black mixture or not, has good building tack so that it can be seamed and built up in the conventional manner used in making rubber footwear, and is readily calenderable so that it can be easily coated onto fabric by a calendering operation.

The high flex crack resistance of my composition is shown by the fact that a cured coating thereof applied to fabric by calendering exhibited no cracking in one million outdoor flexes of the coating. Such high outdoor flex resistance indicates that articles made with my composition will have an unusually long service life.

In making an acid-resisting boot from my novel acid-resisting composition of matter, I prefer to form only the exterior portions of the boot, i. e., the outer leg- and foot-enclosing portion, the heel and sole, and the foxing, from my acid-resisting composition and to form most of the portions which are not exposed to acid from conventional parts such as are used in making regular rubber boots. In building such a boot, I prefer to form the leg from an inner layer of woven textile fabric coated on its outer face with curable but uncured natural (Hevea) rubber stock, a surrounding layer of textile fabric coated on its inner face with curable but uncured natural rubber and on its outer face with an uncured but curable Butyl rubber composition deposited from a solvent-based Butyl rubber cement, and an outermost layer of my acid-resisting composition. These parts are assembled with a premolded heel and sole of my composition, with foxing of my composition, and with other conventional parts such as insole, built-in metal toe cap, arch support, etc. and the entire assembly is then vulcanized in the usual way. The use of the fabric layer coated on its outer face with Butyl rubber laid down from a solvent-based cement is highly advantageous in that it gives an unusual degree of adhesion of the outer acid-resisting layer to the inner natural rubber portions; attempts to use a similar fabric bonding layer wherein the Butyl rubber was applied to the fabric by frictioning have not given satisfactory adhesion.

In Figs. 1 and 2 of the drawing, which portray a preferred construction, the boot is shown as comprising an upper having a conventional leg lining layer 1 of fabric (conveniently 7.2 oz. cotton duck) frictioned on its outer face with a layer 2 of curable natural rubber stock (this coated fabric being a standard item used in making ordinary rubber boots), a layer 3 of fabric (conveniently fabric known in the textile trade as "2.56 Osnaburg" which weighs 5.6 oz. per square yard) frictioned on its inner face with a thin layer 4 of curable natural rubber stock and coated on its outer face with a thin layer 5 of a curable Butyl rubber composition deposited by multiple spread-coating, with drying to remove solvent after each application, of a solvent-based Butyl rubber cement of conventional type (i. e. containing Butyl rubber dissolved in a volatile organic solvent in admixture with conventional curatives), and an outer layer 6 (typically 0.030" thick) of the novel acid-resisting composition of matter described herein, a unitary molded sole and heel 7 of this novel composition, and foxing 8 made of this same composition. The boot is assembled on a last in the obvious manner, the leg portion being formed by applying around the last fabric layer 1 carrying natural rubber layer 2, then applying fabric layer 3 carrying natural rubber layer 4 and Butyl rubber layer 5 and finally applying acid-resisting layer 6. The rest of the boot including the acid-resisting sole and heel member 7 and foxing 8 are assembled in the obvious way and the final assembly is subjected to conventional vulcanization to effect simultaneous vulcanization of all natural rubber- and Butyl rubber-containing portions. It will be understood that the interfaces indicated between layers 2 and 4 and between layers 5 and 6 will not be visible in the actual boot because during vulcanization these layers will merge to form an integral bond.

It will be understood that in assembling a boot such as that just described, the various natural rubber- and Butyl rubber-containing portions thereof are uncured and contain curatives of such type and in such amounts as to effect vulcanization to a soft rubbery state.

Where reference is made in certain of the appended claims to a "molded sole," I intend to denote a unitary sole and heel which usually is made by pre-molding my novel acid-resisting composition in uncured form into a single integral sole and heel, although it could be made from a molded heel and a separate molded sole formed into an integral sole and heel during final vulcanization.

In Fig. 3 there is portrayed coated fabric suitable for making acid-resisting items of clothing and comprising a fabric layer 9 upon which is applied (usually by calendering) a continuous coating 10 of the composition of my invention.

The following example will illustrate my invention more fully. All parts and percentages expressed in this specification and in the appended claims are by weight.

*Example*

The following formulation was taken:

| | Parts |
|---|---|
| GR-I 18 (Butyl rubber) | 100 |
| "Furnex" carbon black (semi-reinforcing furnace black) | 55 |
| "Polyac" (25% para-dinitrosobenzene-75% inert filler) | 0.2 |
| Zinc oxide | 2.5 |

These materials were masticated in a Banbury mixer at 325° F. for 10 minutes. The resulting mixture was then cooled to 175° F. whereupon the following ingredients were intimately commingled therewith:

| | Parts |
|---|---|
| "Oppanol B-200°" | 30 |
| "Alathon 8" (polyethylene) | 40 |
| Sulfur | 2.0 |
| "Monex" (tetramethylthiuram disulfide) | 1.0 |
| "Aminox" (acetone-diphenylamine reaction product) | 1.0 |

The resulting mixture was utilized to make acid-resisting fabric and acid-resisting boots in the manner described above. It could easily be calendered onto fabric or molded as desired and could be easily fabricated into a rubber boot by a conventional rubber footwear building practices. The resulting articles exhibited excellent flexibility, outstanding resistance to liquid and vaporous fuming nitric acid, excellent resistance to diffusion of vaporous fuming nitric acid, excellent flex-cracking resistance, and good resistance to ozone and ultra-violet light.

Having thus described my invention, what I claim and desire to protect by Letters Patent is:

1. A composition of matter comprising a cured mixture of 100 parts of a rubbery copolymer of 90–99.5% of isobutylene and 10–0.5% of a conjugated $C_4$ to $C_6$ diolefin hydrocarbon, from 10 to 40 parts of polyethylene having a molecular weight of from 8,000 to 12,000, from 15 to 70 parts of polyisobutylene having a molecular weight of at least 150,000, and from 50 to 70 parts of carbon black having a surface area in acres per pound no greater than 8.

2. A composition of matter comprising a cured mixture of the product of mastication at a temperature of at least 300° F. of a mixture of 100 parts of a rubbery copolymer of 90–99.5% of isobutylene and 10–0.5% of a conjugated $C_4$ to $C_6$ diolefin hydrocarbon, from 50 to 70 parts of carbon black having a surface area in acres per pound no greater than 8 and from 0.025 to 0.1 part of para-dinitrosobenzene until the curing action of the latter on said copolymer is substantially completely exhausted, with from 10 to 40 parts of polyethylene having a molecular weight of from 8,000 to 12,000 and from 15 to 70 parts of polyisobutylene having a molecular weight of at least 150,000.

3. An acid-resisting boot having an upper formed with a continuous outside layer of a solid mixture of 100 parts of a rubbery copolymer of 90–99.5% of isobutylene and 10–0.5% of a conjugated $C_4$ to $C_6$ diolefin hydrocarbon, from 10 to 40 parts of polyethylene having a molecular weight of from 8,000 to 12,000, from 15 to 70 parts of polyisobutylene having a molecular weight of at least 150,000 and from 50 to 70 parts of carbon black having a surface area in acres per pound no greater than 8, an intermediate layer of coated fabric bonded to said outside layer, said intermediate layer having a coating of cement comprising rubbery copolymer of 90–99.5% of isobutylene and 10–0.5% of conjugated $C_4$ to $C_6$ diolefin hydrocarbon in admixture with curatives therefor, said cement being disposed adjacent to and forming the bond with said outside layer, a layer of natural rubber applied to the opposite side of said fabric, and a fabric lining layer having a coating of natural rubber bonded to said first-named layer of natural rubber, said boot having a sole and foxing formed of a solid mixture answering to the foregoing definition for the mixture from which said outside layer is formed, the aforementioned elements being bonded together by simultaneous vulcanization of the rubber and rubbery copolymer contained therein.

4. An acid-resisting boot having an upper formed with a continuous outside layer of a mixture of the product of mastication at a temperature of at least 300° F. of a mixture of 100 parts of a rubbery copolymer of 90–99.5% of isobutylene and 10–0.5% of a conjugated $C_4$ to $C_6$ diolefin hydrocarbon, from 50 to 70 parts of carbon black having a surface area in acres per pound no greater than 8 and from 0.025 to 0.1 part of para-dinitrosobenzene until the curing action of the latter on said copolymer is substantially completely exhausted, with from 10 to 40 parts of polyethylene having a molecular weight of from 8,000 to 12,000 and from 15 to 70 parts of polyisobutylene having a molecular weight of at least 150,000, an intermediate layer of coated fabric bonded to said outside layer, said intermediate layer having a coating of cement comprising rubbery copolymer of 90–99.5% of isobutylene and 10–0.5% of a conjugated $C_4$ to $C_6$ diolefin hydrocarbon in admixture with curatives therefor, said cement being disposed adjacent to and forming the bond with said outside layer, a layer of natural rubber applied to the opposite side of said fabric, and a fabric lining layer having a coating of natural rubber bonded to said first-named layer of natural rubber, said boot having a sole and foxing formed of a mixture answering to the foregoing definition for the mixture from which said outside layer is formed, the aforementioned elements being bonded together by simultaneous vulcanization of the rubber and rubbery copolymer contained therein.

5. A composition as in claim 2 in which the said rubbery copolymer also contains from 1.5 to 3.5 parts of zinc oxide.

References Cited in the file of this patent

UNITED STATES PATENTS

| 295,062 | Stout | Mar. 11, 1884 |
| 1,732,440 | Glidden et al. | Oct. 22, 1929 |
| 1,885,327 | Burnham | Nov. 1, 1932 |
| 2,471,905 | Smith | May 31, 1949 |
| 2,553,427 | Smith | May 15, 1951 |
| 2,569,540 | Selby | Oct. 2, 1951 |
| 2,656,297 | Davis, Jr., et al. | Oct. 20, 1953 |
| 2,702,286 | Iknayan et al. | Feb. 15, 1955 |